(12) United States Patent
Vlad et al.

(10) Patent No.: US 11,475,227 B2
(45) Date of Patent: Oct. 18, 2022

(54) INTELLIGENT ROUTING SERVICES AND SYSTEMS

(71) Applicant: SDL Inc., Wakefield, MA (US)

(72) Inventors: Mihai Vlad, London (GB);
Abdessamad Echihabi, Los Angeles, CA (US)

(73) Assignee: SDL Inc., Wakefield, MA (US)

( * ) Notice: Subject to any disclaimer, the term of this patent is extended or adjusted under 35 U.S.C. 154(b) by 0 days.

(21) Appl. No.: 17/077,994

(22) Filed: Oct. 22, 2020

(65) Prior Publication Data

US 2021/0042476 A1 Feb. 11, 2021

Related U.S. Application Data

(63) Continuation of application No. 16/226,419, filed on Dec. 19, 2018, now Pat. No. 10,817,676.

(Continued)

(51) Int. Cl.
*G06F 40/58* (2020.01)
*G06F 16/34* (2019.01)
(Continued)

(52) U.S. Cl.
CPC ............ *G06F 40/58* (2020.01); *G06F 16/313* (2019.01); *G06F 16/345* (2019.01);
(Continued)

(58) Field of Classification Search
CPC ...... G06F 40/58; G06F 16/313; G06F 16/345; G06F 40/166; G06F 40/216;
(Continued)

(56) References Cited

U.S. PATENT DOCUMENTS

| 4,661,924 A | 4/1987 | Okamoto et al. |
| 4,674,044 A | 6/1987 | Kalmus et al. |

(Continued)

FOREIGN PATENT DOCUMENTS

| AU | 5240198 A | 5/1998 |
| AU | 694367 B2 | 7/1998 |

(Continued)

OTHER PUBLICATIONS

"Extended European Search Report", European Patent Application No. 18895751.8, dated Aug. 24, 2021, 8 pages.

(Continued)

*Primary Examiner* — Yogeshkumar Patel
(74) *Attorney, Agent, or Firm* — Carr & Ferrell LLP (57) ABSTRACT

A source content routing system is described for distributing source content received from clients such as documents, to translators for performing translation services on the source content. The routing system extracts source content features, which may be represented as vectors. The vectors may be assembled into an input matrix, which may be processed using an artificial neural network, classifier, perceptron, CRF model, and/or the like, to select a translator such as a machine translation system and/or human. The translator provides translation services translation from a source language to a target language, post translation editing, proof reading, quality analysis of a machine, quality analysis of human translation, and/or the like and returns the product to the content routing system or clients.

20 Claims, 4 Drawing Sheets

Related U.S. Application Data (60) Provisional application No. 62/610,591, filed on Dec. 27, 2017.

(51) Int. Cl.
| | | |
|---|---|---|
| *G06N 3/04* | (2006.01) | |
| *G06F 16/31* | (2019.01) | |
| *G06Q 10/10* | (2012.01) | |
| *G06F 40/51* | (2020.01) | |
| *G06F 40/166* | (2020.01) | |
| *G06F 40/216* | (2020.01) | |
| *G06F 40/284* | (2020.01) | |

(52) U.S. Cl.
CPC .......... *G06F 40/166* (2020.01); *G06F 40/216* (2020.01); *G06F 40/284* (2020.01); *G06F 40/51* (2020.01); *G06N 3/04* (2013.01); *G06Q 10/101* (2013.01); *G06Q 10/103* (2013.01)

(58) Field of Classification Search
CPC ..... G06F 40/284; G06F 40/51; G06Q 10/101; G06Q 10/103; G06N 3/04; G06N 3/08; G06N 7/005
See application file for complete search history.

(56) References Cited

U.S. PATENT DOCUMENTS

| | | |
|---|---|---|
| 4,677,552 A | 6/1987 | Sibley, Jr. |
| 4,789,928 A | 12/1988 | Fujisaki |
| 4,845,658 A | 7/1989 | Gifford |
| 4,903,201 A | 2/1990 | Wagner |
| 4,916,614 A | 4/1990 | Kaji et al. |
| 4,920,499 A | 4/1990 | Skeirik |
| 4,962,452 A | 10/1990 | Nogami et al. |
| 4,992,940 A | 2/1991 | Dworkin |
| 5,005,127 A | 4/1991 | Kugimiya et al. |
| 5,020,021 A | 5/1991 | Kaji et al. |
| 5,075,850 A | 12/1991 | Asahioka et al. |
| 5,093,788 A | 3/1992 | Shiotani et al. |
| 5,111,398 A | 5/1992 | Nunberg et al. |
| 5,140,522 A | 8/1992 | Ito et al. |
| 5,146,405 A | 9/1992 | Church |
| 5,168,446 A | 12/1992 | Wiseman |
| 5,224,040 A | 6/1993 | Tou |
| 5,243,515 A | 9/1993 | Lee |
| 5,243,520 A | 9/1993 | Jacobs et al. |
| 5,283,731 A | 2/1994 | Lalonde et al. |
| 5,295,068 A | 3/1994 | Nishino et al. |
| 5,301,109 A | 4/1994 | Landauer et al. |
| 5,325,298 A | 6/1994 | Gallant |
| 5,349,368 A | 9/1994 | Takeda et al. |
| 5,351,189 A | 9/1994 | Doi |
| 5,408,410 A | 4/1995 | Kaji |
| 5,418,717 A | 5/1995 | Su et al. |
| 5,423,032 A | 6/1995 | Byrd et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,541,836 A | 7/1996 | Church et al. |
| 5,548,508 A | 8/1996 | Nagami |
| 5,555,343 A | 9/1996 | Luther |
| 5,587,902 A | 12/1996 | Kugimiya |
| 5,640,575 A | 6/1997 | Maruyama et al. |
| 5,642,522 A | 6/1997 | Zaenen et al. |
| 5,644,775 A | 7/1997 | Thompson et al. |
| 5,687,384 A | 11/1997 | Nagase |
| 5,708,780 A | 1/1998 | Levergood et al. |
| 5,708,825 A | 1/1998 | Sotomayor |
| 5,710,562 A | 1/1998 | Gormish et al. |
| 5,715,314 A | 2/1998 | Payne et al. |
| 5,715,402 A | 2/1998 | Popolo |
| 5,724,424 A | 3/1998 | Gifford |
| 5,724,593 A | 3/1998 | Hargrave, III et al. |
| 5,751,957 A | 5/1998 | Hiroya et al. |
| 5,764,906 A | 6/1998 | Edelstein et al. |
| 5,765,138 A | 6/1998 | Aycock et al. |
| 5,794,219 A | 8/1998 | Brown |
| 5,799,269 A | 8/1998 | Schabes et al. |
| 5,802,502 A | 9/1998 | Gell et al. |
| 5,802,525 A | 9/1998 | Rigoutsos |
| 5,812,776 A | 9/1998 | Gifford |
| 5,818,914 A | 10/1998 | Fujisaki |
| 5,819,265 A | 10/1998 | Ravin et al. |
| 5,826,244 A | 10/1998 | Huberman |
| 5,842,204 A | 11/1998 | Andrews et al. |
| 5,844,798 A | 12/1998 | Uramoto |
| 5,845,143 A | 12/1998 | Yamauchi et al. |
| 5,845,306 A | 12/1998 | Schabes et al. |
| 5,848,386 A | 12/1998 | Motoyama |
| 5,850,442 A | 12/1998 | Mufti |
| 5,850,561 A | 12/1998 | Church et al. |
| 5,864,788 A | 1/1999 | Kutsumi |
| 5,873,056 A | 2/1999 | Liddy |
| 5,884,246 A | 3/1999 | Boucher et al. |
| 5,895,446 A | 4/1999 | Takeda et al. |
| 5,909,492 A | 6/1999 | Payne et al. |
| 5,917,484 A | 6/1999 | Mullaney |
| 5,950,194 A | 9/1999 | Bennett et al. |
| 5,956,711 A | 9/1999 | Sullivan et al. |
| 5,956,740 A | 9/1999 | Nosohara |
| 5,960,382 A | 9/1999 | Steiner |
| 5,966,685 A | 10/1999 | Flanagan et al. |
| 5,974,371 A | 10/1999 | Hirai et al. |
| 5,974,372 A | 10/1999 | Barnes |
| 5,974,413 A | 10/1999 | Beauregard et al. |
| 5,987,401 A | 11/1999 | Trudeau |
| 5,987,403 A | 11/1999 | Sugimura |
| 6,044,344 A | 3/2000 | Kanevsky |
| 6,044,363 A | 3/2000 | Mori et al. |
| 6,047,299 A | 4/2000 | Kaijima |
| 6,049,785 A | 4/2000 | Gifford |
| 6,070,138 A | 5/2000 | Iwata |
| 6,085,162 A | 7/2000 | Cherny |
| 6,092,034 A | 7/2000 | McCarley et al. |
| 6,092,035 A | 7/2000 | Kurachi et al. |
| 6,131,082 A | 10/2000 | Hargrave, III et al. |
| 6,139,201 A | 10/2000 | Carbonell et al. |
| 6,154,720 A | 11/2000 | Onishi et al. |
| 6,161,082 A | 12/2000 | Goldberg et al. |
| 6,163,785 A | 12/2000 | Carbonell et al. |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer et al. |
| 6,260,008 B1 | 7/2001 | Sanfilippo |
| 6,278,969 B1 | 8/2001 | King et al. |
| 6,279,112 B1 | 8/2001 | O'toole, Jr. et al. |
| 6,285,978 B1 | 9/2001 | Bernth et al. |
| 6,301,574 B1 | 10/2001 | Thomas et al. |
| 6,304,846 B1 | 10/2001 | George et al. |
| 6,338,033 B1 | 1/2002 | Bourbonnais et al. |
| 6,341,372 B1 | 1/2002 | Datig |
| 6,345,244 B1 | 2/2002 | Clark |
| 6,345,245 B1 | 2/2002 | Sugiyama et al. |
| 6,347,316 B1 | 2/2002 | Redpath |
| 6,353,824 B1 | 3/2002 | Boguraev et al. |
| 6,356,865 B1 | 3/2002 | Franz et al. |
| 6,385,568 B1 | 5/2002 | Brandon et al. |
| 6,393,389 B1 | 5/2002 | Chanod et al. |
| 6,401,105 B1 | 6/2002 | Carlin et al. |
| 6,415,257 B1 | 7/2002 | Junqua |
| 6,442,524 B1 | 8/2002 | Ecker et al. |
| 6,449,599 B1 | 9/2002 | Payne et al. |
| 6,470,306 B1 | 10/2002 | Pringle et al. |
| 6,473,729 B1 | 10/2002 | Gastaldo et al. |
| 6,477,524 B1 | 11/2002 | Taskiran |
| 6,490,358 B1 | 12/2002 | Geer et al. |
| 6,490,563 B2 | 12/2002 | Hon |
| 6,526,426 B1 | 2/2003 | Lakritz |
| 6,622,121 B1 | 9/2003 | Crepy et al. |
| 6,623,529 B1 | 9/2003 | Lakritz |

(56) References Cited

U.S. PATENT DOCUMENTS

| | | |
|---|---|---|
| 6,658,627 B1 | 12/2003 | Gallup et al. |
| 6,687,671 B2 | 2/2004 | Gudorf et al. |
| 6,731,625 B1 | 5/2004 | Eastep et al. |
| 6,782,384 B2 | 8/2004 | Sloan et al. |
| 6,865,528 B1 | 3/2005 | Huang |
| 6,920,419 B2 | 7/2005 | Kitamura |
| 6,952,691 B2 | 10/2005 | Drissi et al. |
| 6,976,207 B1 | 12/2005 | Rujan |
| 6,990,439 B2 | 1/2006 | Xun |
| 6,993,473 B2 | 1/2006 | Cartus |
| 7,013,264 B2 | 3/2006 | Dolan |
| 7,020,601 B1 | 3/2006 | Hummel et al. |
| 7,031,908 B1 | 4/2006 | Huang |
| 7,050,964 B2 | 5/2006 | Menzes |
| 7,089,493 B2 | 8/2006 | Hatori et al. |
| 7,100,117 B1 | 8/2006 | Chwa et al. |
| 7,110,938 B1 | 9/2006 | Cheng et al. |
| 7,124,092 B2 | 10/2006 | O'toole, Jr. et al. |
| 7,155,440 B1 | 12/2006 | Kronmiller et al. |
| 7,177,792 B2 | 2/2007 | Knight |
| 7,185,276 B2 | 2/2007 | Keswa |
| 7,191,447 B1 | 3/2007 | Ellis et al. |
| 7,194,403 B2 | 3/2007 | Okura et al. |
| 7,207,005 B2 | 4/2007 | Laktritz |
| 7,209,875 B2 | 4/2007 | Quirk et al. |
| 7,249,013 B2 | 7/2007 | Al-Onaizan |
| 7,266,767 B2 | 9/2007 | Parker |
| 7,272,639 B1 | 9/2007 | Levergood et al. |
| 7,295,962 B2 | 11/2007 | Marcu |
| 7,295,963 B2 | 11/2007 | Richardson |
| 7,333,927 B2 | 2/2008 | Lee |
| 7,340,388 B2 | 3/2008 | Soricut |
| 7,343,551 B1 | 3/2008 | Bourdev |
| 7,353,165 B2 | 4/2008 | Zhou et al. |
| 7,369,984 B2 | 5/2008 | Fairweather |
| 7,389,222 B1 | 6/2008 | Langmead |
| 7,389,223 B2 | 6/2008 | Atkin |
| 7,448,040 B2 | 11/2008 | Ellis et al. |
| 7,454,326 B2 | 11/2008 | Marcu |
| 7,509,313 B2 | 3/2009 | Colledge |
| 7,516,062 B2 | 4/2009 | Chen et al. |
| 7,533,013 B2 | 5/2009 | Marcu |
| 7,533,338 B2 | 5/2009 | Duncan et al. |
| 7,580,828 B2 | 8/2009 | D'Agostini |
| 7,580,960 B2 | 8/2009 | Travieso et al. |
| 7,587,307 B2 | 9/2009 | Cancedda et al. |
| 7,594,176 B1 | 9/2009 | English |
| 7,596,606 B2 | 9/2009 | Codignotto |
| 7,620,538 B2 | 11/2009 | Marcu |
| 7,620,549 B2 | 11/2009 | Di Cristo |
| 7,624,005 B2 | 11/2009 | Koehn |
| 7,627,479 B2 | 12/2009 | Travieso et al. |
| 7,640,158 B2 | 12/2009 | Detlef et al. |
| 7,668,782 B1 | 2/2010 | Reistad et al. |
| 7,680,647 B2 | 3/2010 | Moore |
| 7,693,717 B2 | 4/2010 | Kahn et al. |
| 7,698,124 B2 | 4/2010 | Menezes et al. |
| 7,716,037 B2 | 5/2010 | Precoda |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,813,918 B2 | 10/2010 | Muslea |
| 7,865,358 B2 | 1/2011 | Green |
| 7,925,493 B2 | 4/2011 | Watanabe |
| 7,925,494 B2 | 4/2011 | Cheng et al. |
| 7,945,437 B2 | 5/2011 | Mount et al. |
| 7,983,896 B2 | 7/2011 | Ross et al. |
| 7,983,897 B2 | 7/2011 | Chin |
| 7,983,903 B2 | 7/2011 | Gao |
| 8,050,906 B1 | 11/2011 | Zimmerman et al. |
| 8,078,450 B2 | 12/2011 | Anisimovich et al. |
| 8,135,575 B1 | 3/2012 | Dean |
| 8,195,447 B2 | 6/2012 | Anismovich |
| 8,214,196 B2 | 7/2012 | Yamada |
| 8,239,186 B2 | 8/2012 | Chin |
| 8,239,207 B2 | 8/2012 | Seligman |
| 8,244,519 B2 | 8/2012 | Bicici et al. |
| 8,249,855 B2 | 8/2012 | Zhou et al. |
| 8,275,604 B2 | 9/2012 | Jiang et al. |
| 8,286,185 B2 | 10/2012 | Ellis et al. |
| 8,296,127 B2 | 10/2012 | Marcu |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,407,217 B1 | 3/2013 | Zhang |
| 8,423,346 B2 | 4/2013 | Seo et al. |
| 8,442,812 B2 | 5/2013 | Ehsani |
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,620,793 B2 | 12/2013 | Knyphausen et al. |
| 8,635,327 B1 | 1/2014 | Levergood et al. |
| 8,635,539 B2 | 1/2014 | Young |
| 8,666,725 B2 | 3/2014 | Och |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,818,790 B2 | 8/2014 | He et al. |
| 8,843,359 B2 | 9/2014 | Lauder |
| 8,862,456 B2 | 10/2014 | Krack et al. |
| 8,874,427 B2 | 10/2014 | Ross et al. |
| 8,898,052 B2 | 11/2014 | Waibel |
| 8,903,707 B2 | 12/2014 | Zhao |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,972,268 B2 | 3/2015 | Waibel |
| 9,026,425 B2 | 5/2015 | Nikoulina |
| 9,053,202 B2 | 6/2015 | Viswanadha |
| 9,081,762 B2 | 7/2015 | Wu |
| 9,128,929 B2 | 9/2015 | Albat |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,262,403 B2 | 2/2016 | Christ |
| 9,342,506 B2 | 5/2016 | Ross et al. |
| 9,396,184 B2 | 7/2016 | Roy |
| 9,400,786 B2 | 7/2016 | Lancaster et al. |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman |
| 9,600,472 B2 | 3/2017 | Cheng et al. |
| 9,600,473 B2 | 3/2017 | Leydon |
| 9,613,026 B2 | 4/2017 | Hodson |
| 10,198,438 B2 | 2/2019 | Cheng et al. |
| 10,216,731 B2 | 2/2019 | Cheng et al. |
| 10,248,650 B2 | 4/2019 | Ross et al. |
| 10,635,863 B2 | 4/2020 | de Vrieze et al. |
| 10,817,676 B2* | 10/2020 | Vlad .................... G06F 40/166 |
| 11,256,867 B2 | 2/2022 | Echihabi et al. |
| 11,321,540 B2 | 5/2022 | de Vrieze et al. |
| 2002/0002461 A1 | 1/2002 | Tetsumoto |
| 2002/0046018 A1 | 4/2002 | Marcu |
| 2002/0083103 A1 | 6/2002 | Ballance |
| 2002/0093416 A1 | 7/2002 | Goers et al. |
| 2002/0099547 A1 | 7/2002 | Chu et al. |
| 2002/0103632 A1 | 8/2002 | Dutta et al. |
| 2002/0107684 A1 | 8/2002 | Gao |
| 2002/0110248 A1 | 8/2002 | Kovales et al. |
| 2002/0111787 A1 | 8/2002 | Knyphausen et al. |

(56) References Cited

U.S. PATENT DOCUMENTS

| | | |
|---|---|---|
| 2002/0124109 A1 | 9/2002 | Brown |
| 2002/0138250 A1 | 9/2002 | Okura et al. |
| 2002/0165708 A1 | 11/2002 | Kumhyr |
| 2002/0169592 A1 | 11/2002 | Aityan |
| 2002/0188439 A1 | 12/2002 | Marcu |
| 2002/0198701 A1 | 12/2002 | Moore |
| 2003/0004702 A1 | 1/2003 | Higinbotham |
| 2003/0009320 A1 | 1/2003 | Furuta |
| 2003/0016147 A1 | 1/2003 | Evans |
| 2003/0040900 A1 | 2/2003 | D'Agostini |
| 2003/0069879 A1 | 4/2003 | Sloan et al. |
| 2003/0078766 A1 | 4/2003 | Appelt et al. |
| 2003/0105621 A1 | 6/2003 | Mercier |
| 2003/0110023 A1 | 6/2003 | Bangalore et al. |
| 2003/0120479 A1 | 6/2003 | Parkinson et al. |
| 2003/0125928 A1 | 7/2003 | Lee et al. |
| 2003/0158723 A1 | 8/2003 | Masuichi et al. |
| 2003/0182279 A1 | 9/2003 | Willows |
| 2003/0194080 A1 | 10/2003 | Michaelis et al. |
| 2003/0200094 A1 | 10/2003 | Gupta |
| 2003/0229622 A1 | 12/2003 | Middelfart |
| 2003/0233222 A1 | 12/2003 | Soricut et al. |
| 2004/0024581 A1 | 2/2004 | Koehn et al. |
| 2004/0034520 A1 | 2/2004 | Langkilde-Geary |
| 2004/0044517 A1 | 3/2004 | Palmquist |
| 2004/0102201 A1 | 5/2004 | Levin |
| 2004/0122656 A1 | 6/2004 | Abir |
| 2004/0172235 A1 | 9/2004 | Pinkham et al. |
| 2004/0255281 A1 | 12/2004 | Imamura et al. |
| 2005/0021323 A1 | 1/2005 | Li |
| 2005/0055212 A1 | 3/2005 | Nagao |
| 2005/0075858 A1 | 4/2005 | Pournasseh et al. |
| 2005/0076342 A1 | 4/2005 | Levins et al. |
| 2005/0094475 A1 | 5/2005 | Naoi |
| 2005/0149316 A1 | 7/2005 | Ushioda et al. |
| 2005/0171758 A1 | 8/2005 | Palmquist |
| 2005/0171944 A1 | 8/2005 | Palmquist |
| 2005/0197827 A1 | 9/2005 | Ross et al. |
| 2005/0222837 A1 | 10/2005 | Deane |
| 2005/0222973 A1 | 10/2005 | Kaiser |
| 2005/0273314 A1 | 12/2005 | Chang et al. |
| 2006/0015320 A1 | 1/2006 | Och |
| 2006/0095526 A1 | 5/2006 | Levergood et al. |
| 2006/0095848 A1 | 5/2006 | Naik |
| 2006/0136277 A1 | 6/2006 | Perry |
| 2006/0256139 A1 | 11/2006 | Gikandi |
| 2006/0282255 A1 | 12/2006 | Lu |
| 2006/0287844 A1 | 12/2006 | Rich |
| 2007/0043553 A1 | 2/2007 | Dolan |
| 2007/0112553 A1 | 5/2007 | Jacobson |
| 2007/0118378 A1 | 5/2007 | Skuratovsky |
| 2007/0136470 A1 | 6/2007 | Chikkareddy et al. |
| 2007/0150257 A1 | 6/2007 | Cancedda et al. |
| 2007/0192110 A1 | 8/2007 | Mizutani et al. |
| 2007/0230729 A1 | 10/2007 | Naylor et al. |
| 2007/0233460 A1 | 10/2007 | Lancaster et al. |
| 2007/0233463 A1 | 10/2007 | Sparre |
| 2007/0244702 A1 | 10/2007 | Kahn et al. |
| 2007/0294076 A1 | 12/2007 | Shore et al. |
| 2008/0077395 A1 | 3/2008 | Lancaster et al. |
| 2008/0086298 A1 | 4/2008 | Anismovich |
| 2008/0109374 A1 | 5/2008 | Levergood et al. |
| 2008/0141180 A1 | 6/2008 | Reed et al. |
| 2008/0147378 A1 | 6/2008 | Hall |
| 2008/0154577 A1 | 6/2008 | Kim |
| 2008/0201344 A1 | 8/2008 | Levergood et al. |
| 2008/0243834 A1 | 10/2008 | Rieman et al. |
| 2008/0270930 A1 | 10/2008 | Slosar |
| 2008/0288240 A1 | 11/2008 | D'Agostini et al. |
| 2008/0294982 A1 | 11/2008 | Leung et al. |
| 2009/0094017 A1 | 4/2009 | Chen et al. |
| 2009/0132230 A1 | 5/2009 | Kanevsky et al. |
| 2009/0187577 A1 | 7/2009 | Reznik et al. |
| 2009/0204385 A1 | 8/2009 | Cheng et al. |
| 2009/0217196 A1 | 8/2009 | Neff et al. |
| 2009/0240539 A1 | 9/2009 | Slawson |
| 2009/0248182 A1 | 10/2009 | Logan et al. |
| 2009/0248482 A1 | 10/2009 | Knyphausen et al. |
| 2009/0313005 A1 | 12/2009 | Jaquinta |
| 2009/0326917 A1 | 12/2009 | Hegenberger |
| 2010/0057439 A1 | 3/2010 | Ideuchi et al. |
| 2010/0057561 A1 | 3/2010 | Gifford |
| 2010/0121630 A1 | 5/2010 | Mende et al. |
| 2010/0138213 A1 | 6/2010 | Bicici et al. |
| 2010/0179803 A1 | 7/2010 | Sawaf |
| 2010/0223047 A1 | 9/2010 | Christ |
| 2010/0241482 A1 | 9/2010 | Knyphausen et al. |
| 2010/0262621 A1 | 10/2010 | Ross et al. |
| 2011/0066469 A1 | 3/2011 | Kadosh |
| 2011/0077933 A1 | 3/2011 | Miyamoto et al. |
| 2011/0097693 A1 | 4/2011 | Crawford |
| 2011/0184719 A1 | 7/2011 | Christ |
| 2012/0022852 A1 | 1/2012 | Tregaskis |
| 2012/0046934 A1 | 2/2012 | Cheng et al. |
| 2012/0095747 A1 | 4/2012 | Ross et al. |
| 2012/0185235 A1 | 7/2012 | Albat |
| 2012/0330990 A1 | 12/2012 | Chen et al. |
| 2013/0173247 A1 | 7/2013 | Hodson |
| 2013/0325442 A1 | 12/2013 | Dahlmeier |
| 2013/0346062 A1 | 12/2013 | Lancaster et al. |
| 2014/0006006 A1 | 1/2014 | Christ |
| 2014/0012565 A1 | 1/2014 | Lancaster et al. |
| 2014/0058718 A1 | 2/2014 | Kunchukuttan |
| 2014/0142917 A1 | 5/2014 | D'Penha |
| 2014/0142918 A1 | 5/2014 | Dotterer |
| 2014/0229257 A1 | 8/2014 | Reistad et al. |
| 2014/0297252 A1 | 10/2014 | Prasad et al. |
| 2014/0358519 A1 | 12/2014 | Mirkin |
| 2014/0358524 A1 | 12/2014 | Papula |
| 2014/0365201 A1 | 12/2014 | Gao |
| 2015/0032645 A1 | 1/2015 | Mckeown |
| 2015/0051896 A1 | 2/2015 | Simard |
| 2015/0142415 A1 | 5/2015 | Cheng et al. |
| 2015/0169554 A1 | 6/2015 | Ross et al. |
| 2015/0186362 A1 | 7/2015 | Li |
| 2016/0162473 A1 | 6/2016 | Cogley et al. |
| 2016/0162478 A1 | 6/2016 | Blassin et al. |
| 2016/0170974 A1 | 6/2016 | Martinez Corria et al. |
| 2016/0253319 A1 | 9/2016 | Ross et al. |
| 2017/0046333 A1 | 2/2017 | Mirkin et al. |
| 2017/0052954 A1 | 2/2017 | State et al. |
| 2017/0068664 A1 | 3/2017 | Martinez Corria et al. |
| 2017/0083523 A1 | 3/2017 | Philip et al. |
| 2017/0132214 A1 | 5/2017 | Cheng et al. |
| 2017/0169015 A1 | 6/2017 | Huang |
| 2018/0060287 A1 | 3/2018 | Srinivasan et al. |
| 2018/0137108 A1 | 5/2018 | Martinez Corria et al. |
| 2018/0300218 A1 | 10/2018 | Lipka et al. |
| 2018/0300318 A1 | 10/2018 | Sittel et al. |
| 2018/0307683 A1 | 10/2018 | Lipka et al. |
| 2019/0129946 A1 | 5/2019 | de Vrieze et al. |
| 2019/0171717 A1 | 6/2019 | Cheng et al. |
| 2019/0197116 A1 | 6/2019 | Vlad et al. |
| 2020/0110802 A1 | 4/2020 | Echihabi et al. |
| 2020/0175234 A1 | 6/2020 | de Vrieze et al. |
| 2022/0150192 A1 | 5/2022 | Echihabi et al. |

FOREIGN PATENT DOCUMENTS

| | | |
|---|---|---|
| AU | 5202299 A | 10/1999 |
| AU | 199938259 A | 11/1999 |
| AU | 761311 B2 | 9/2003 |
| CA | 2221506 A1 | 12/1996 |
| CA | 231184 C | 7/2009 |
| CN | 1179289 C | 12/2004 |
| CN | 1770144 A | 5/2006 |
| CN | 101019113 A | 8/2007 |
| CN | 101826072 A | 9/2010 |
| CN | 101248415 B | 10/2010 |
| CN | 102053958 A | 5/2011 |
| CN | 102193914 A | 9/2011 |
| CN | 102662935 A | 9/2012 |
| CN | 102902667 A | 1/2013 |
| DE | 69525374 T2 | 8/2002 |

(56) References Cited

FOREIGN PATENT DOCUMENTS

| | | |
|---|---|---|
| DE | 69431306 T2 | 5/2003 |
| DE | 69633564 T2 | 11/2005 |
| EP | 0262938 A1 | 4/1988 |
| EP | 0668558 A1 | 8/1995 |
| EP | 0830774 B1 | 2/1998 |
| EP | 0830774 A2 | 3/1998 |
| EP | 0887748 A2 | 12/1998 |
| EP | 1076861 A1 | 2/2001 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235177 A2 | 8/2002 |
| EP | 0734556 B1 | 9/2002 |
| EP | 1266313 A2 | 12/2002 |
| EP | 1489523 A2 | 12/2004 |
| EP | 1076861 B1 | 6/2005 |
| EP | 1787221 A2 | 5/2007 |
| EP | 1889149 A2 | 2/2008 |
| EP | 2226733 A1 | 9/2010 |
| EP | 2299369 A1 | 3/2011 |
| EP | 2317447 A1 | 5/2011 |
| EP | 2336899 A2 | 6/2011 |
| EP | 2317447 B1 | 1/2014 |
| EP | 3732592 | 11/2020 |
| GB | 2241359 A | 8/1991 |
| GB | 2433403 A | 6/2007 |
| GB | 2468278 A | 9/2010 |
| GB | 2474839 A | 5/2011 |
| JP | H04152466 A | 5/1992 |
| JP | H05135095 A | 6/1993 |
| JP | H05197746 A | 8/1993 |
| JP | H06035962 A | 2/1994 |
| JP | H06259487 A | 9/1994 |
| JP | H07093331 A | 4/1995 |
| JP | H08055123 A | 2/1996 |
| JP | H09114907 A | 5/1997 |
| JP | H10063747 A | 3/1998 |
| JP | H10097530 A | 4/1998 |
| JP | H10509543 A | 9/1998 |
| JP | H11507752 A | 7/1999 |
| JP | 3190881 B2 | 7/2001 |
| JP | 3190882 B2 | 7/2001 |
| JP | 3260693 B2 | 2/2002 |
| JP | 2002513970 A | 5/2002 |
| JP | 3367675 B2 | 1/2003 |
| JP | 2003150623 A | 5/2003 |
| JP | 2003157402 A | 5/2003 |
| JP | 2004318510 A | 11/2004 |
| JP | 2005107597 A | 4/2005 |
| JP | 3762882 B2 | 4/2006 |
| JP | 2006216073 A | 8/2006 |
| JP | 2007042127 A | 2/2007 |
| JP | 2007249606 A | 9/2007 |
| JP | 2008152670 A | 7/2008 |
| JP | 2008152760 A | 7/2008 |
| JP | 4485548 B2 | 6/2010 |
| JP | 4669373 B2 | 4/2011 |
| JP | 4669430 B2 | 4/2011 |
| JP | 2011095841 A | 5/2011 |
| JP | 4718687 B2 | 7/2011 |
| JP | 5473533 B2 | 4/2014 |
| WO | WO199406086 A1 | 3/1994 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9804061 A1 | 1/1998 |
| WO | WO9819224 A2 | 5/1998 |
| WO | WO9952626 A1 | 10/1999 |
| WO | WO199957651 A1 | 11/1999 |
| WO | WO2000057320 A2 | 9/2000 |
| WO | WO200101289 A1 | 1/2001 |
| WO | WO200129696 A1 | 4/2001 |
| WO | WO2002029622 A1 | 4/2002 |
| WO | WO2002039318 A1 | 5/2002 |
| WO | WO2006016171 A2 | 2/2006 |
| WO | WO2006121849 A2 | 11/2006 |
| WO | WO2007068123 A1 | 6/2007 |
| WO | WO2008055360 A1 | 5/2008 |
| WO | WO2008083503 A1 | 7/2008 |
| WO | WO2008147647 A1 | 12/2008 |
| WO | WO2010062540 A1 | 6/2010 |
| WO | WO2010062542 A1 | 6/2010 |
| WO | WO2019133506 A1 | 7/2019 |

OTHER PUBLICATIONS

"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.

"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.

"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.

"Lilt API _ API Reference," Lilt website [online], retrieved on Oct. 20, 2017, Retrieved from the Internet:<https://lilt.com/docs/api>, 53 pages.

"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.

"Projects—Knowledge Base,"Lilt website [online], Jun. 7, 2017, retrieved on Oct. 20, 2017, Retrieved from the Internet <https://lilt.com/kb/project-managers/projects>, 3 pages.

"Getting Started with lilt," Lilt website [online], May 30, 2017, retrieved on Oct. 20, 2017, Retrieved from the Internet <https://lilt.com/kb/api/lilt-js>, 6 pages.

"Interactive Translation—Knowledge Base," Lilt website [online], Aug. 17, 2017, retrieved on Oct. 20, 2017, Retrieved from the Internet: <https://lilt.com/kb/api/interactive-translation>, 2 pages.

Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval.

Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.

Sethy et al., "Building Topic Specific Language Models Fromwebdata Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.

Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.

Business Wire, "Language Weaver Introduces User-Managed Customization Tool," Oct. 25, 2005, 3 pages. Retrieved from http:ProQuest.

Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.

Potet et al., "Preliminary Experiments on Using Users' Post-Editions to Enhance a SMT System," Proceedings of the European Association for Machine Translation (EAMT), May 2011, pp. 161-168. Retrieved from Retrieved at http://www.mt-archive.info/EAMT-2011-Potet.pdf.

Ortiz-Martinez et al., "An Interactive Machine Translation System with Online Learning" Proceedings of the ACL-HLT 2011 System (56) References Cited

OTHER PUBLICATIONS

Demonstrations, Jun. 21, 2011, pp. 68-73. Retrieved from http://www.aclweb.org/anthology/P11-4012.
Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.
Levenberg et al."Stream-based Translation Models for Statistical Machine Translation" Human Language Technologies: The 2010 Annual Conference of the North American Chapter of the ACL, Dec. 31, 2010, pp. 394-402.
Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.
"Summons to attend oral proceeding pursuant to Rule 115(1)(EPC)," European Patent Application 10185842.1, Aug. 11, 2017, 9 pages.
Westfall, Edith R., "Integrating Tools with the Translation Process North American Sales and Support," Jan. 1, 1998, pp. 501-505, XP055392884. Retrieved from the Internet: <URL:https://rd.springer.com/content/pdf/10.1007/3-540-49478-2_46.pdf>.
"Summons to attend oral proceeding pursuant to Rule 115(1)(EPC)," European Patent Application 09179150.9, Dec. 14, 2017, 17 pages.
"Decision to Refuse," European Patent Application 10185842.1, dated Mar. 22, 2018, 16 pages.
"International Search Report" and "Written Opinion of the International Searching Authority," Patent Cooperation Treaty Application No. PCT/US2018/067213, dated Mar. 25, 2019, 7 pages.
First Examination Report dated Nov. 26, 2009 for European Patent Application 05772051.8, filed May 8, 2006, 8 pages.
Second Examination Report dated Feb. 19, 2013 for European Patent Application 06759147.9, filed May 8, 2006, 5 pages.
Langlais, et al. "TransType: a Computer-Aided Translation Typing System", in Conference on Language Resources and Evaluation, 2000, pp. 46-51.
First Notice of Reasons for Rejection dated Jun. 18, 2013 for Japanese Patent Application 2009-246729, filed Oct. 27, 2009, 3 pages.
First Notice of Reasons for Rejection dated Jun. 4, 2013 for Japanese Patent Application 2010-045531, filed Oct. 27, 2009, 4 pages.
Rejection Decision dated May 14, 2013 for Chinese Patent Application 200910253192.6, filed Dec. 14, 2009, 9 pages.
Matsunaga, et al. "Sentence Matching Algorithm of Revised Documents with Considering Context Information," IEICE Technical Report, 2003, pp. 43-48.
Pennington, Paula K. Improving Quality in Translation Through an Awareness of Process and Self-Editing Skills. Eastern Michigan University, ProQuest, UMI Dissertations Publishing, 1994, 115 pages.
Notice of Allowance dated Jan. 7, 2014 for Japanese Patent Application 2009-246729, filed Oct. 27, 2009, 3 pages.
Kumano et al., "Japanese-English Translation Selection Using Vector Space Model," Journal of Natural Language Processing; vol. 10; No. 3; (2003); pp. 39-59.
Final Rejection and a Decision to Dismiss the Amendment dated Jan. 7, 2014 for Japanese Patent Application 2010-045531, filed Mar. 2, 2010, 4 pages.
Office Action dated Feb. 24, 2014 for Chinese Patent Application No. 201010521841.9, filed Oct. 25, 2010, 30 pages.
Extended European Search Report dated Oct. 24, 2014 for European Patent Application 10185842.1, filed Oct. 1, 2010, 8 pages.
Summons to attend oral proceeding pursuant to Rule 115(1)(EPC) mailed Oct. 13, 2014 in European Patent Application 00902634.5 filed Jan. 26, 2000, 8 pages.
Summons to attend oral proceeding pursuant to Rule 115(1)(EPC) mailed Feb. 3, 2015 in European Patent Application 06759147.9 filed May 8, 2006, 5 pages.
Decision to Refuse dated Mar. 2, 2015 in European Patent Application 00902634.5 filed Jan. 26, 2000, 15 pages.
Brief Communication dated Jun. 17, 2015 in European Patent Application 06759147.9 filed May 8, 2006, 20 pages.
Somers, H. "EBMT Seen as Case-based Reasoning" Mt Summit VIII Workshop on Example-Based Machine Translation, 2001, pp. 56-65, XP055196025.
The Minutes of Oral Proceedings mailed Mar. 2, 2015 in European Patent Application 00902634.5 filed Jan. 26, 2000, 19 pages.
Notification of Reexamination dated Aug. 18, 2015 in Chinese Patent Application 200910253192.6, filed Dec. 14, 2009, 24 pages.
Decision to Refuse dated Aug. 24, 2015 in European Patent Application 06759147.9, filed May 8, 2006, 26 pages.
Papineni, Kishore, et al., "BLEU: A Method for Automatic Evaluation of Machine Translation," Proceedings of the 40th Annual Meeting on Association for Computational Linguistics. Association for Computational Linguistics, 2002, pp. 311-318.
"Office Action," European Patent Application No. 10185842.1, dated Dec. 8, 2016, 7 pages.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.
Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.
Hardmeier et al. "Tree Kernels for Machine Translation Quality Estimation" [W12-3112] Proceedings of the Seventh Workshop on (56) References Cited

OTHER PUBLICATIONS

Statistical Machine Translation,Jun. 7, 2012, pp. 109-113. Retrieved from: http://aclanthology.info/volumes/proceedings-of-the-seventh-workshop-onstatistical-machine-translation.

Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.

Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.

Popovic, Maja. "Morpheme- and POS-based IBM1 and language model scores fortranslation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.

Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.

Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.

Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the Internet:<https://lilt.com/kb/translators/best-practices>, 2 pages.

"Data Security—Knowledge Base," Lilt website [online], Oct. 14, 2016 [retrieved on Oct. 19, 2017], Retrieved from the Internet:<https://lilt.com/kb/security>, 1 pages.

"Data Security and Confidentiality," Lilt website [online], 2017 [retrieved on Oct. 19, 2017], Retrieved from the Internet <https://lilt.com/security>, 7 pages.

"Memories—Knowledge Base," Lilt website [online], Jun. 7, 2017 [retrieved on Oct. 19, 2017], Retrieved from the Internet:<https://lilt.com/kb/project-managers/memory>, 4 pages.

"Memories (API)—Knowledge Base," Lilt website [online], Jun. 2, 2017 [retrieved on Oct. 19, 2017], Retrieved from the Internet:<https://lilt.com/kb/api/memories>, 1 page.

"Quoting—Knowledge Base," Lilt website [online], Jun. 7, 2017 [retrieved on Oct. 19, 2017], Retrieved from the Internet <https://lilt.com/kb/project-managers/quoting>, 4 pages.

"The Editor—Knowledge Base," Lilt website [online], Aug. 15, 2017 [retrieved on Oct. 19, 2017], Retrieved from the Internet:<https://lilt.com/kb/translators/editor>, 5 pages.

"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.

"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.

"Getting Started—Knowledge Base," Lilt website [online], Apr. 11, 2017 [retrieved on Oct. 20, 2017], Retrieved from the Internet:<https://lilt.com/kb/translators/getting-started>, 2 pages.

Komatsu, H et al., "Corpus-based predictive text input", "Proceedings of the 2005 International Conference on Active Media Technology", 2005, IEEE, pp. 75 80, ISBN 0-7803-9035-0.

Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111 131.

De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan, pp. 107-114. Retrieved from the Internet: http://mi.eng.cam.ac.uk/~ad465/agispert/docs/papers/TP_gispert.pdf [retrieved on Mar. 30, 2010].

Planas, Emmanuel: "SIMILIS Second-generation translation memory software," Translating and the Computer 27, Nov. 2005 [London: Aslib, 2005], 7 pages.

Net Auction, www.netauction.net/dragonart.html, "Come bid on original illustrations," by Greg & Tim Hildebrandt, Feb. 3, 2001. (last accessed Nov. 16, 2011), 3 pages.

Web Pages—BidNet, www.bidnet.com, "Your link to the State and Local Government Market," including Bid Alert Service, Feb. 7, 2009. (last accessed Nov. 16, 2011), 1 page.

Web Pages Christie's, www.christies.com, including "How to Buy," and "How to Sell," Apr. 23, 2009. (last accessed Nov. 16, 2011), 1 page.

Web Pages Artrock Auction, www.commerce.com, Auction Gallery, Apr. 7, 2007. (last accessed Nov. 16, 2011), 1 page.

Trados Translator's Workbench for Windows, 1994-1995, Trados GbmH, Stuttgart, Germany, pp. 9-13 and 27-96. Copy unavailable.

Notification of Reasons for Refusal for Japanese Application No. 2000-607125 dated Nov. 10, 2009 (Abstract Only), 3 pages.

Ross et al., U.S. Appl. No. 11/071,706, filed Mar. 3, 2005, Office Communication dated Dec. 13, 2007, 19 pages.

Ross et al., U.S. Appl. No. 11/071,706, filed Mar. 3, 2005, Office Communication dated Oct. 6, 2008, 36 pages.

Ross et al., U.S. Appl. No. 11/071,706, filed Mar. 3, 2005, Office Communication dated Jun. 9, 2009, 37 pages.

Ross et al., U.S. Appl. No. 11/071,706, filed Mar. 3, 2005, Office Communication dated Feb. 18, 2010, 37 pages.

Colucci, Office Communication for U.S. Appl. No. 11/071,706 dated Sep. 24, 2010, 18 pages.

Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.

International Search Report and Written Opinion dated Sep. 4, 2007 in Patent Cooperation Treaty Application No. PCT/US06/17398, 9 pages.

XP 002112717 Machine translation software for the Internet, Harada K.; et al, vol. 28, Nr:2, pp. 66-74. Sanyo Technical Review San'yo Denki Giho, Hirakata, JP ISSN 0285-516X, Oct. 1, 1996.

XP 000033460 Method to Make a Translated Text File Have the Same Printer Control Tags as the Original Text File, vol. 32, Nr:2, pp. 375-377, IBM Technical Disclosure Bulletin, International Business Machines Corp. (Thornwood), US ISSN 0018-8689, Jul. 1, 1989.

XP 002565038—Integrating Machine Translation into Translation Memory Systems, Matthias Heyn, pp. 113-126, TKE. Terminology and Knowledge Engineering. Proceedings International Congress on Terminology and Knowledge Engineering, Aug. 29-30, 1996.

XP 002565039—Linking translation memories with example-based machine translation, Michael Carl; Silvia Hansen, pp. 617-624, Machine Translation Summit. Proceedings, Sep. 1, 1999.

(56) References Cited

OTHER PUBLICATIONS

XP 55024828 TransType2 an Innovative Computer-Assisted Translation System, ACL 2004, Jul. 21, 2004, Retrieved from the Internet: http://www.mt-archive.info/ACL-2004-Esteban.pdf [retrieved on Apr. 18, 2012], 4 pages.
Bourigault, Surface Grammatical Analysis for the Extraction of Terminological Noun Phrases, Proc. of Coling-92, Aug. 23, 1992, pp. 977-981, Nantes, France.
Thurmair, Making Term Extraction Tools Usable, The Joint Conference of the 8th International Workshop of the European Association for Machine Translation, May 15, 2003, Dublin, Ireland, 10 pages.
Sanfillipo, Section 5.2 Multiword Recognition and Extraction, Eagles LE3-4244, Preliminary Recommendations on Lexical Semantic Encoding, Jan. 7, 1999, pp. 176-186.
Hindle et al., Structural Ambiguity and lexical Relations, 1993, Association for Computational Linguistics, vol. 19, No. 1, pp. 103-120.
Ratnaparkhi, A Maximum Entropy Model for Part-Of-Speech Tagging, 1996, Proceedings for the conference on empirical methods in natural language processing, V.1, pp. 133-142.
Somers, H. "Review Article: Example-based Machine Translation," Machine Translation, Issue 14, pp. 113-157, 1999.
Civera, et al. "Computer-Assisted Translation Tool Based on Finite-State Technology," In: Proc. of EAMT, 2006, pp. 33-40 (2006).
Okura, Seiji et al., "Translation Assistance by Autocomplete," The Association for Natural Language Processing, Publication 13th Annual Meeting Proceedings, Mar. 2007, p. 678-679.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Nonparallel, Comparable Texts," Proceeding COLING '998 Proceedings of the 17th International Conference on Computational Linguistics, 1998, pp. 414-420.
First Office Action dated Dec. 26, 2008 in Chinese Patent Application 200580027102.1, filed Aug. 11, 2005, 7 pages.
Second Office Action dated Aug. 28, 2009 in Chinese Patent Application 200580027102.1, filed Aug. 11, 2005, 8 pages.
Third Office Action dated Apr. 28, 2010 in Chinese Patent Application 200580027102.1, filed Aug. 11, 2005, 8 pages.
Summons to attend oral proceeding pursuant to Rule 115(1)(EPC) mailed Mar. 20, 2012 in European Patent Application 05772051.8 filed Aug. 11, 2005, 7 pages.
Notification of Reasons for Rejection dated Jan. 9, 2007 for Japanese Patent Application 2000-547557, filed Apr. 30, 1999, 2 pages.
Decision of Rejection dated Jul. 3, 2007 for Japanese Patent Application 2000-547557, filed Apr. 30, 1999, 2 pages.
Extended European Search Report and Written Opinion dated Jan. 26, 2011 for European Patent Application 10189145.5, filed on Oct. 27, 2010, 9 pages.
Notice of Reasons for Rejection dated Jun. 26, 2012 for Japanese Patent Application P2009-246729. filed Oct. 27, 2009, 8 pages.
Search Report dated Jan. 22, 2010 for United Kingdom Application GB0918765.9, filed Oct. 27, 2009, 5 pages.
Notice of Reasons for Rejection dated Mar. 30, 2010 for Japanese Patent Application 2007-282902. filed Apr. 30, 1999, 5 pages.
Decision of Rejection dated Mar. 15, 2011 for Japanese Patent Application 2007-282902, filed Apr. 30, 1999, 5 pages.
First Office Action dated Oct. 18, 2011 for Chinese Patent Application 2009102531926, filed Dec. 14, 2009, 7 pages.
Second Office Action dated Aug. 14, 2012 for Chinese Patent Application 2009102531926, filed Dec. 14, 2009, 6 pages.
European Search Report dated Apr. 12, 2010 for European Patent Application 09179150.9, filed Dec. 14, 2009, 6 pages.
First Examination Report dated Jun. 16, 2011 for European Patent Application 09179150.9, filed Dec. 14, 2009, 6 pages.
Notice of Reasons for Rejection dated Jul. 31, 2012 for Japanese Patent Application 2010-045531, filed Mar. 2, 2010, 10 pages.
First Examination Report dated Oct. 26, 2012 for United Kingdom Patent Application GB0903418.2, filed Mar. 2, 2009, 6 pages.
First Office Action dated Jun. 19, 2009 for Chinese Patent Application 200680015388.6, filed May 8, 2006, 15 pages.

\* cited by examiner

INTELLIGENT ROUTING SERVICES AND SYSTEMS

CROSS-REFERENCE TO RELATED APPLICATIONS

The present application is a continuation of U.S. patent application Ser. No. 16/226,419, filed on Dec. 19, 2018 and titled "Intelligent Routing Services and Systems," which claims priority and benefit to U.S. provisional patent application Ser. No. 62/610,591 filed on Dec. 27, 2017 and titled "Intelligent Routing Services and Systems," which are all incorporated by reference herein in their entirety.

FIELD OF THE PRESENT TECHNOLOGY

The present disclosure relates to the technical field of machine translation systems and methods. More particularly, the present invention is in the technical field of distribution of documents between machine translators, human translators, and post translation editors.

BACKGROUND

The translation process in a typical language service provider is orchestrated by a human Project Manager who collects requests from customers or prospects. The project manager then analyzes content of the source documents to price the work. The project manage then makes a decision based on personal experience and knowledge of available translators on how best distribute the source documents to the translators. The project manager is also responsible for ensuring delivery of the completed work back to the customer. Currently, tools do not exist for equipping project managers to make fast and accurate decisions.

SUMMARY

Various embodiments of the present technology include a hardware solution for a way of improving the routing of source content such as documents to translators for translation services. The present technology improves on a human selection of a translator manually based personal experience with known translators and a cursory read of a source document to develop an impression of the content. Instead, the claimed technology provides a way of selecting of routing a document that includes performing a stochastic analysis of the source content to extract source content feature and generate vectors from the extracted features. These feature vectors may then be assembled into an input matrix representing source content features. A router may use an artificial neural network including hidden layers along with weight matrixes representing connections between layers and a target matrix representing translators for processing the input matrix to select a translator, and may transfer the document to the selected translator for translation services.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more of the same or other features, integers, steps, operations, elements, components, and/or groups thereof.

It will be understood that like or analogous elements and/or components referred to herein may be identified throughout the drawings with like reference characters. It will be further understood that several of the figures are merely schematic representations and/or block diagrams of the present technology. As such, some of the components may have been distorted from their actual scale for pictorial clarity.

Figure 1:
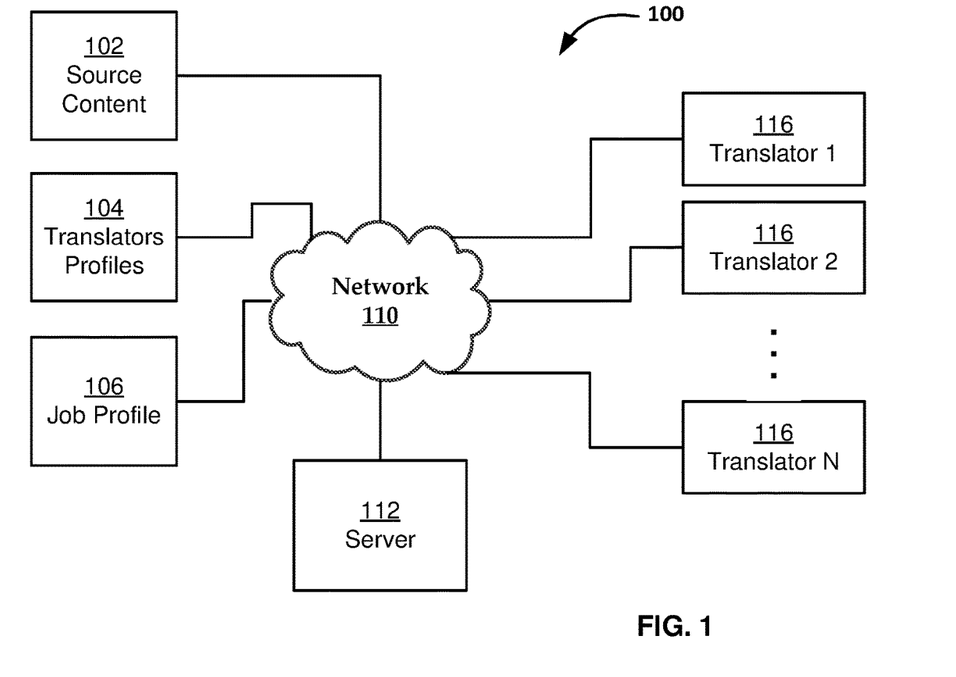
FIG. 1 is a block diagram illustrating an environment for routing documents to translators, in accordance with aspects of the technology.

FIG. 1 is a block diagram illustrating an environment 100 for routing documents to translators. The environment 100 of FIG. 1 includes a network 110, a content distribution server 112, source content 102, profiles of a plurality of translators (translators profiles 104), a job profile 106, and a plurality of translators 1-N, i.e., translators 116. The content distribution server 112 is a special purpose computer system configured specifically to receive source content 102 and route the source content 102 to one or more of the plurality of translators 116. In some embodiments, the content distribution server 112 is configured to receive source content 102 via a network 110. The server may also receive translator profiles 104, and a job profile 106 via the network 110. The content distribution server 112 may route the source content 102 to one or more translators 116 via the network 110 based on an analysis of the source content 102, the translator profiles 104, and the job profile.

In various embodiments, translation services include translation from a source language to a target language, post translation editing, proof reading, quality analysis of a machine, quality analysis of human translation, and/or the like. Translators 116 include machine translation systems, human translators using machine-assisted translation platforms, interactive adaptive machine translations systems, and/or the like.

In various embodiments, the source content 102 includes text, a document, a batch of documents, or a portion of a document. Documents include various combinations of text, images, graphs, drawings, videos, audio, animation, media, web pages, links to web pages, web objects, and/or the like.

The translator profiles include information about translators 116, such as previous work content, quality, speed, schedule, time zone, target language skills (speed, quality, etc.) for one or more target languages, post editing skills (speed, quality, etc.), domain skills for one or more domains, source content in progress, and/or the like. Additional information about the translators 116 includes previous association of a translator with the type of document the job requires (e.g., familiarity with a document may enhance the speed of delivery and consistency); domain preference (e.g., efficiency within a domain); association with a document or similar document; translator native language. Translator quality features include overall quality/rating, translator quality/rating on a given domain/content type, translator experience/qualification, reliability and consistency, translator workload, translator availability, translator preference (comfortable with MT Post Editing). The translators profiles 104 may include information about all the translators 116 or some of the translators 116. In some embodiment the translators profiles 104 include information about translators that are not included in the translators 116.

In various embodiments the job profile 106 includes information about how the job is to be processed, such as target language, cost, margin, time, deadlines, desired quality, translation, post translation editing, inspection, and/or the like.

The content distribution server 112 may route the entire source content 102 to a single translator 116, or a portion of the source content 102 may be routed to the single translator 116. In some embodiments the source content 102 is separated into portions of the content are routed multiple translators 116. For example, source content 102 may include a batch of documents, and the documents may be routed to translators 116 such that part of the documents are routed to a machine translation system, part of the documents are routed to a first human translator 116, part to a second human translator 116, and so on.

It may be appreciated that one or more of the source content 102, translators profiles 104, and/or the job profile 106 may be communicated directly to the content distribution server 112 or may be generated at the content distribution server 112. It may be further appreciated that one or more translators 1-N (translators 116) may be in direct communication with the content distribution server 112. In some embodiments, one or more translators 116 are a part of the content distribution server 112, for example, in the case of a translator that includes machine translation services. The content distribution server 112 may route the source content 102 directly to one or more of the translators 116.

In some embodiments one or more of the network 110, content distribution server 112, source content 102, translators profiles 104, job profiles 106, and a plurality of translators 116 (e.g., machine translator systems) FIG. 1 are implemented within a cloud-based computing environment (not illustrated) In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

A cloud based environment may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Figure 2:
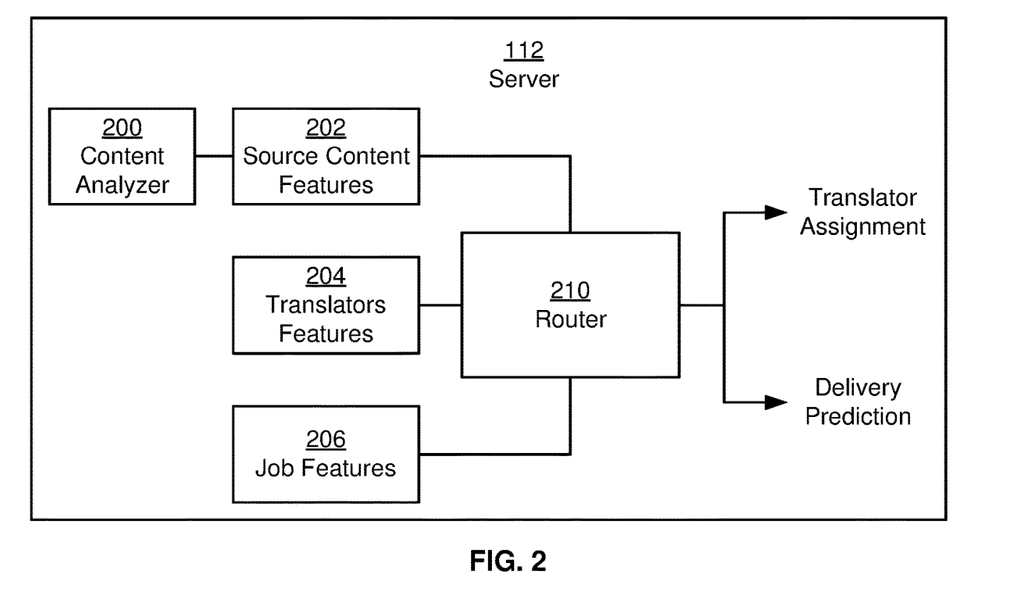
FIG. 2 is a block diagram illustrating a server for routing source content to translators, in accordance with aspects of the technology.

FIG. 2 is a block diagram illustrating exemplary details of a content distribution server 112 for routing the source content 102 to the translators 116. As discussed elsewhere herein, the content distribution server 112 is a special purpose computer system that includes specific components for accomplishing special tasks. The content distribution server 112 of FIG. 2 includes a content analyzer 200, source content features 202, translators features 204, job features 206, and a router 210. The content analyzer 200 is configured to extract source content features 202 from the source content 102. In various embodiments, the source content features 202 include a summary of the source content 102, keywords in the source content 102, key-phrases in the source content 102, one or more domains identified as being related to the source content 102, one or more entities being recognized as a source of the source content 102, a complexity of the source content 102, a suitability of the source content 102 for machine translation, and/or the like. Each of the source content features 202 may be represented as a vector of the features (content feature vector). In various embodiments, content feature vectors include a summary vector, keywords and key-phrases vector, domains vector, entities vector, complexity vector, and MT suitability vector. In some embodiments, the source content features 202 are represented as a matrix. Each of the content feature vectors (summary vector, keywords and key-phrases vector, domains vector, entities vector, complexity vector, and MT suitability vector) may be used as a column or row of the matrix.

The translators features 204 may be extracted from the translators profiles 104 at the content distribution server 112. In some embodiments, the translators features 204 are generated at the translators profiles 104 and then received from the translators profiles 104. In various embodiments, the translators features 204 include previous work content, quality, speed, schedule, time zone, target language skills (speed, quality, etc.) for one or more target languages, post editing skills (speed, quality, etc.), domain skills for one or more domains, source content 102 in progress, and/or the like. The translators features 204 may be represented as a vector of the features (translator feature vector). In various embodiments, the translator feature vectors represent the previous work content, quality, speed, schedule, time zone, target language skills, post editing skills, domain skills, load, etc. Each of a plurality of translators may be represented by a translator feature vector. The translators features 204 may include a plurality of translator feature vectors, one for each of a plurality of translators. In some embodiments, the translators features 204 are represented as a matrix. Each of the translator feature vectors may be used as a column or row of the matrix.

The job features 206 may be extracted from the job profile 106 at the content distribution server 112. In some embodiments, the job features are generated at the job profile 106 and then received from the job profile 106. In various embodiments, the job features 206 include job information, such as cost, margin, time, quality, target language, and/or the like. The job features 206 may be represented as a vector of the features such as the cost, margin, time, quality, target language, etc.

The router 210 is configured to select translators and route content to the translators. The router 210 may receive the source content features 202, the translators features 204, and the job features 206 as input. The router may select one or more translators 116 based on the source content features 202, translators features 204, and job features 206. The source content features 202 may be received as a matrix or as one or more vectors. Similarly, the translators features 204 and/or the job features 206 may be received as a matrix or one or more vectors. In some embodiments, the router 210 is a special purpose processor for using the source content features 202 in conjunction with translators features 204 and the job features 206 for selecting a translator 116 and routing the source content 102 to the selected translator 116. The source content 102 may be divided into a plurality of portions. The router 210 may select a plurality of translators 116 and one or more portions of the source content 102 may be routed to each of the selected translators 116.

While the content analyzer 200, source content features 202, translators features 204, job features 206, and router 210 of FIG. 2 are illustrated as being components of a content distribution server 112, any combination of one or more of these components may be disposed in a standalone computer system, a mobile device, a cloud-based computing environment, and/or the like. For example, the content analyzer 200 and source content features 202 may be components of the source content 102. Similarly the translator features 204 may be component of the translators profiles 104 and/or a job features 206 may be a component of the job profile 106. While the content distribution server 112 of FIG. 2 is illustrated as including the content analyzer 200, source content features 202, translators features 204, job features 206, and router 210, more or fewer components may be included in the content distribution server 112. For example, the content distribution server 112 may include a machine translation system.

Figure 3:
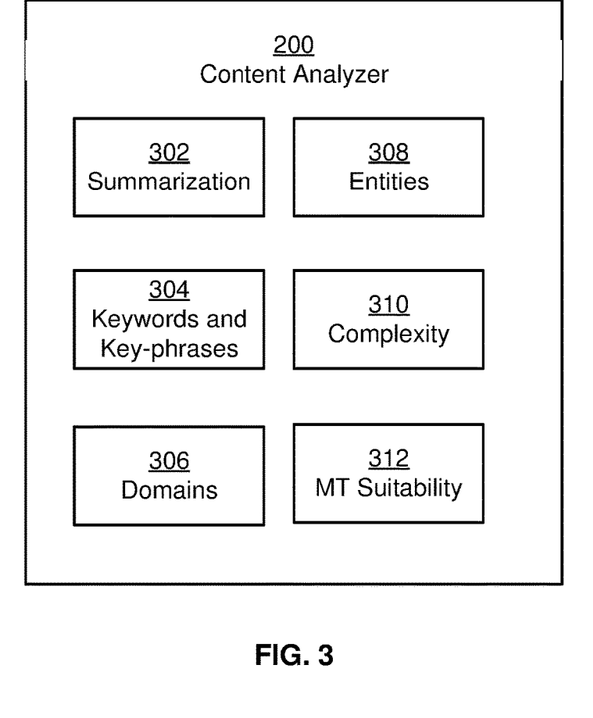
FIG. 3 is a block diagram illustrating exemplary details of the content analyzer of FIG. 2.

FIG. 3 is a block diagram illustrating exemplary details of the content analyzer 200 of FIG. 2. The content analyzer 200 includes means for extracting source content features 202 represented by vectors from the source content 102. The content analyzer 200 is a special purpose computer system configured specifically to receive source content 102, extract source content features 202 from the received source content 102, and generate vectors representing the extracted source content features 202. The content analyzer 200 of FIG. 3 includes a summarization module 302, a keywords and key-phrases module 304, a domains module 306, an entities module 308, a complexity module 310, and a machine translation suitability module 312. More or fewer modules may be included in the content analyzer 200.

The summarization module 302 includes a means for extracting sentences from the source content 102. The extracted sentences may be represented in the form of vectors for use as source content features 202. The summary features may comprise vector representations of sentences selected from the source content 102. The summarization module 302 may use a centroid based approach that includes neural vector representations of text segments.

Figure 4:
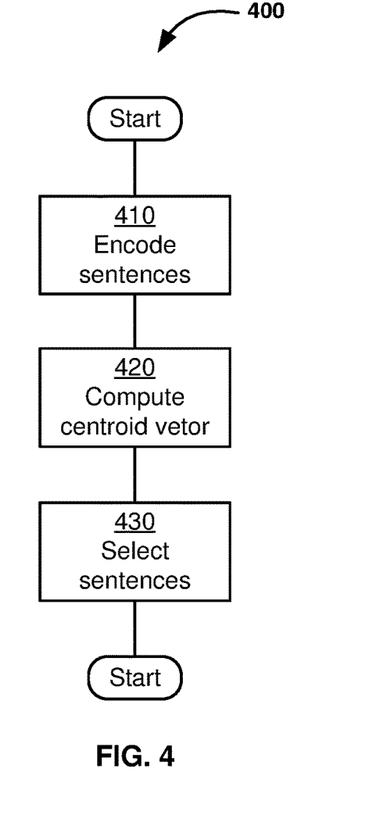
FIG. 4 illustrates an algorithm for summarizing source content.

FIG. 4 illustrates an algorithm for summarizing source content 102. At 410 each sentence in the source text may be encoded into a vector representation. At step 420, a centroid vector may be computed as a sum of the sentence vector representations encoded in step 410. At step 430, sentences with highest cosine similarity to the centroid vector may be selected for inclusion in summary. The summary features may comprise vector representations of the selected sentences. Persons having ordinary skill in the relevant arts would understand with the present application before them how to use a special purpose computer module to encode sentence text as vector representations, compute centroid vectors from sentence vector representations and determining cosine similarity between sentences, and centroid vectors for use as source content features 202.

The keywords and key-phrases module 304 includes means for extracting keywords and key-phrases from the source content 102. The extracted keywords and key-phrases may be represented in the form of vectors for use as source content features 202. An example of means for extracting keywords and/or key-phrases is nonparametric spherical topic modeling of the source content 102 with word embeddings for extracting keywords and/or key-phrases. Another example is non-parametric latent Dirichlet analysis of the source content 102, for example a hierarchical Dirichlet process mixture model, which allows the number of keywords and/or key-phrases for topics to be unbounded and learned from data. Yet another example is classifying the source content 102 using numerical statistical analysis including term frequency-inverse document frequency (Tf-Idf), for example, to calculate the importance of words and/or word phrases in the source content 102 and rank the words and phrases. The keyword and key-phrase features may comprise vector representations of key words and key-phrases. Persons having ordinary skill in the relevant arts would understand with the present application before them how to construct and use a special purpose computer module to extract keywords and key-phrases using techniques such as nonparametric spherical topic modeling with word embeddings, non-parametric latent Dirichlet analysis, and Tf-Idf technologies applied to source content 102. Persons having ordinary skill in the relevant arts would understand with the present application before them how to generate a vector representation of a plurality of keywords and/or key-phrases for use as a source content feature 202.

The domain identification module 306 includes means for identifying one or more domain of source content 102. The identified domains may be represented in the form of vectors for use as source content features 202. In various embodiments the means includes a multilayer perceptron, a Term Frequency, an Inverse Document Frequency, and a weighted bag of words to generate a domain feature vector. The domain feature vector may include values representing one or more domains that the source content 102 is related to.

Figure 5:
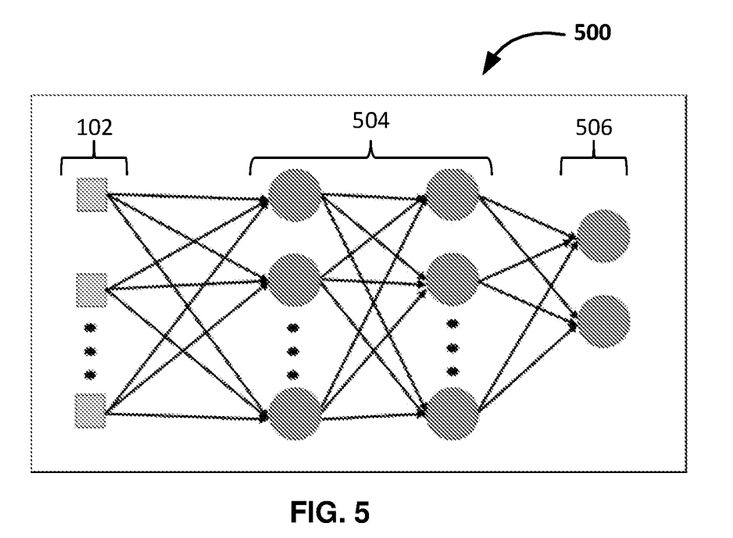
FIG. 5 is an illustration of a multilayer perceptron.

FIG. 5 is an illustration of a multilayer perceptron 500. The multilayer perceptron 500 of FIG. 5 includes as inputs the source content 102 and as output the domain feature vector 506. The domain feature vector 506 may include an array of one or more values. Each value may represent a score or probability that the source content 102 is related to a specific domain. In various embodiments, the hidden layers 504 include a weighted bag of words layer, TF layer, IDF layer, and/or the like. Persons having ordinary skill in the relevant arts would understand with the present application before them how to use a special purpose computer module to identify one or more domains for the source content 102 using various combinations of multilayer perceptron 500 and hidden layers 504 including TF, layers, IDF layers, weighted bag of words layers, and/or like technologies, to generate domain feature vectors for use as source content features 202.

The entity recognition module 308 includes means for recognizing named entities in source content 102. The named entities may be represented in the form of vectors for use as source content features 202. In various embodiments the means includes Conditional Random Field model (CFR) and entity recognition technology. CRFs are a type of discriminative undirected probabilistic graphical model. CRF's may be used to encode known relationships between observations and construct consistent interpretations. CRF's are often used for labeling or parsing of sequential data, such as natural language processing. Specifically, CRFs find applications in named entity recognition. Entity recognition (also known as named entity recognition(NER), entity identification, entity chunking and entity extraction) is a subtask of information extraction that seeks to locate and classify named entities occurring in unstructured text, into pre-defined categories such as the person names, organizations, locations, medical codes, time expressions, quantities, monetary values, percentages, etc. The entity feature vector includes values representing one or more categories of entities that occur in the source content 102.

Figure 6:
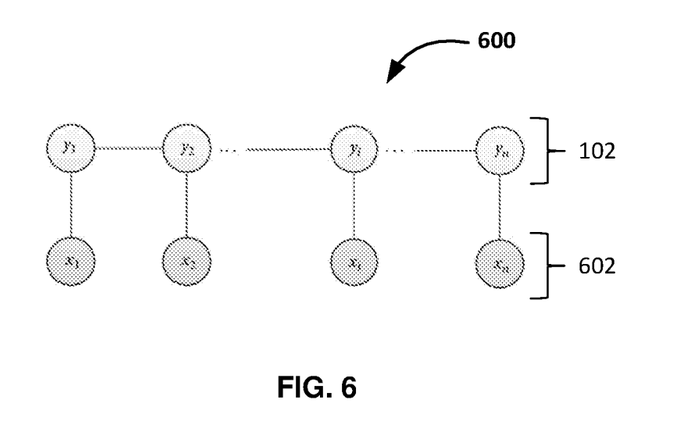
FIG. 6 is a diagram of an undirected probabilistic graphical CRF model for entity recognition using CFR.

FIG. 6 is a diagram 600 of an undirected probabilistic graphical CRF model for entity recognition using CFR. The diagram 600 includes as inputs the source content 102, which may encode relationships between the source content 102 and sequential data including as observation data in the form of an entity feature vector 602. The entity feature vector 602 may include an array of one or more values. Each value may represent a score or probability that an entity has been recognized or identified in the source content 102. In some embodiments, encoding relationships between the source content 102 and the entity feature vector 602 includes hand crafting the relationships. Persons having ordinary skill in the relevant arts would understand with the present application before them how to use a special purpose computer module to recognize or identify one or more entities in the source content 102 using CFR applied to recognition technologies, to generate entity feature vectors for use as source content features 202.

The complexity module 310 includes means for calculating complexity of the source content 102. The calculated complexity may be represented in the form of vectors for use as source content features 202. In various embodiments the means for calculating complexity of the source content 102 include means for calculating syntactic complexity, lexical complexity, uber index complexity, Flesch Kincade complexity score, and overall complexity, of the source content 102.

Syntactic complexity may be calculated from various combinations of a part of speech ratio, constituency tree depth ration and constituent ratio.

Lexical complexity (sometimes referred to as lexical richness) may be calculated for the source content 102, for example using a Herdan ratio:

$$TTR = \frac{V}{N}$$

where TTR is a type-token ratio, V is vocabulary, and N is text length. A normalized Herdan Index H may also be calculated from:

$$H = \frac{\log V}{\log N}$$

Examples of modifications of a Herdan index include those proposed by:

$$\text{Guiraud } G = \frac{V}{\sqrt{N}}$$

$$\text{Dugast: } D = \frac{\log V}{\log(\log N)}$$

$$\text{Brunet: } B = N^{V^{-k}}$$

An Uber index may be calculated from:

$$UberIndex = \frac{(\log \text{tokens})^2}{\log \text{tokens} - \log \text{types}}$$

A Flesch Kincaid score F (or Flesch reading-ease score) may be calculated from a formula:

$$F = 206.835 - 1.015 \frac{T_{words}}{T_{sentences}} - 84.6 \frac{T_{syllables}}{T_{words}}$$

Where "$T_{words}$" is the total number of words, "$T_{sentencess}$" is the total number of sentences and "$T_{syllables}$" is the total number of syllables in the source content 102. The meaning of the score F may be indicated by table 1 below.

TABLE 1

| Score | School level | Notes |
|---|---|---|
| 100.0-90.0 | 5th grade | Very easy to read. Easily understood by an average 11-year-old student. |
| 90.0-80.0 | 6th grade | Easy to read. Conversational English for consumers. |
| 80.0-70.0 | 7th grade | Fairly easy to read. |
| 70.0-60.0 | 8th & 9th grade | Plain English. Easily understood by 13- to 15-year-old students |
| 60.0-50.0 | 10th to 12th grade | Fairly difficult to read. |
| 50.0-30.0 | College | Difficult to read. |
| 30.0-0.0 | College graduate | Very difficult to read. Best understood by university graduates. |

The complexity features may comprise vector representations of complexity scores. Persons having ordinary skill in the relevant arts would understand with the present application before them how to construct and use a special purpose computer module to calculate complexity scores for syntactic complexity, lexical complexity, Uber index, FleschKincaid score, and overall complexity using information about the source content 102 and techniques including POS ratio, Constituency tree depth ration, constituent ratio, vocabulary size, text length, normalized Herdan Index log tokens, log types, total words, total sentences, total syllables applied to source content 102 to generate complexity vectors for use as source content features 202.

The machine translation (MT) suitability module 312 includes means for calculating machine translation suitability of the source content 102. The calculated MT suitability may be represented in the form of vectors for use as source content features 202. In various embodiments the means for calculating machine translatability include calculating a MT suitability score where:

$T_{words}$ is the total number of words in source content 102
P=probability of each sentence of source content 102

Raw LM score per sentence is LM=−log(P)

The Document perplexity may be calculated from the relation:

$$\text{Perplexity} = \frac{\sum_{\text{Sentences}} LM}{e^{T_{words}}}$$

The ME suitability score may be calculated as:

$$MT_{suitability} = \max\left(5, \min\left(5 - 4\frac{\text{Perplexity} - 10}{70}, 1\right)\right)$$

where the scaled document perplexity is calculated using a language model trained on NMT parallel data resources.

The MT suitability features may comprise vector representations of the suitability of the source content 102 for translation using one or more machine translation technologies. Persons having ordinary skill in the relevant arts would understand with the present application before them how to construct and use a special purpose computer module to calculate a MT suitability score using techniques such as sentence probability, LM score, document Perplexity and the equation for MT suitability score applied to source content 102 to generate vector representations of MT suitability for use as source content features 202. A different MT suitability score may be generated from the source content 102 for each of a plurality of types of machine translators. It is noteworthy that MT suitability is an important feature to use in determining where to route a document because machine translation is substantially faster and less expensive than human translation.

In various embodiments, the router 210 is a neural network, a classifier, a matrix, a search engine, decision tree, a finite state acceptor, and/or the like. In the example of the router 210 being a neural network, the source content features 202 may be received by the router 210 from the content analyzer 200 as an input matrix representing the source content features 202, or as a plurality of feature vectors representing the source content features 202.

For example, each of the source features generated by the content analyzer 200 using modules 302-312 may be represented as one or more feature vectors. The router 210 may receive the plurality of feature vectors from the content analyzer 200 and assemble the feature vectors into an input matrix including columns comprising the feature vectors. In some embodiments, the content analyzer 200 assembles the generated feature vectors into columns of the input matrix. Input matrix is then received from the content analyzer 200 by the router 210 as a representation of the source content features 202. The router 210 may also assemble feature vectors for the translators features 204 and/or the job features 206 into additional columns of the input matrix.

The router 210 may be an artificial neural network (e.g., a multi-layer perceptron) for processing complex inputs such as presented by the input matrix assembled from feature vectors generated by the content analyzer 200 and representing source content features 202. Connections between one or more layers of the neural network may be represented by a weight matrix or more than one weight matrix. A target matrix may be formed, e.g., having columns for the translators 116. The translator columns may be vectors that include weights representing delivery predictions for features such as cost, margin, time, quality. Persons having ordinary skill in the relevant arts would understand with the present application before them how to construct and use a special purpose computer router 210 using artificial neural network technology to train a weight matrix and process to process an input matrix and target matrix for selecting one or more translators 116 to provide translation services for source content 102.

In some embodiments, a router 210 is a classifier that ranks translators based on the source content 102 and/or the source content features 202, translators features 204, and job features 206. The router 210 may output a delivery prediction score for each of various categories of delivery prediction for each translator. Delivery prediction categories for each translator 116 may include cost, margin, time, quality, and/or the like. The delivery prediction scores may be used for selecting a translator 116.

Figure 7:
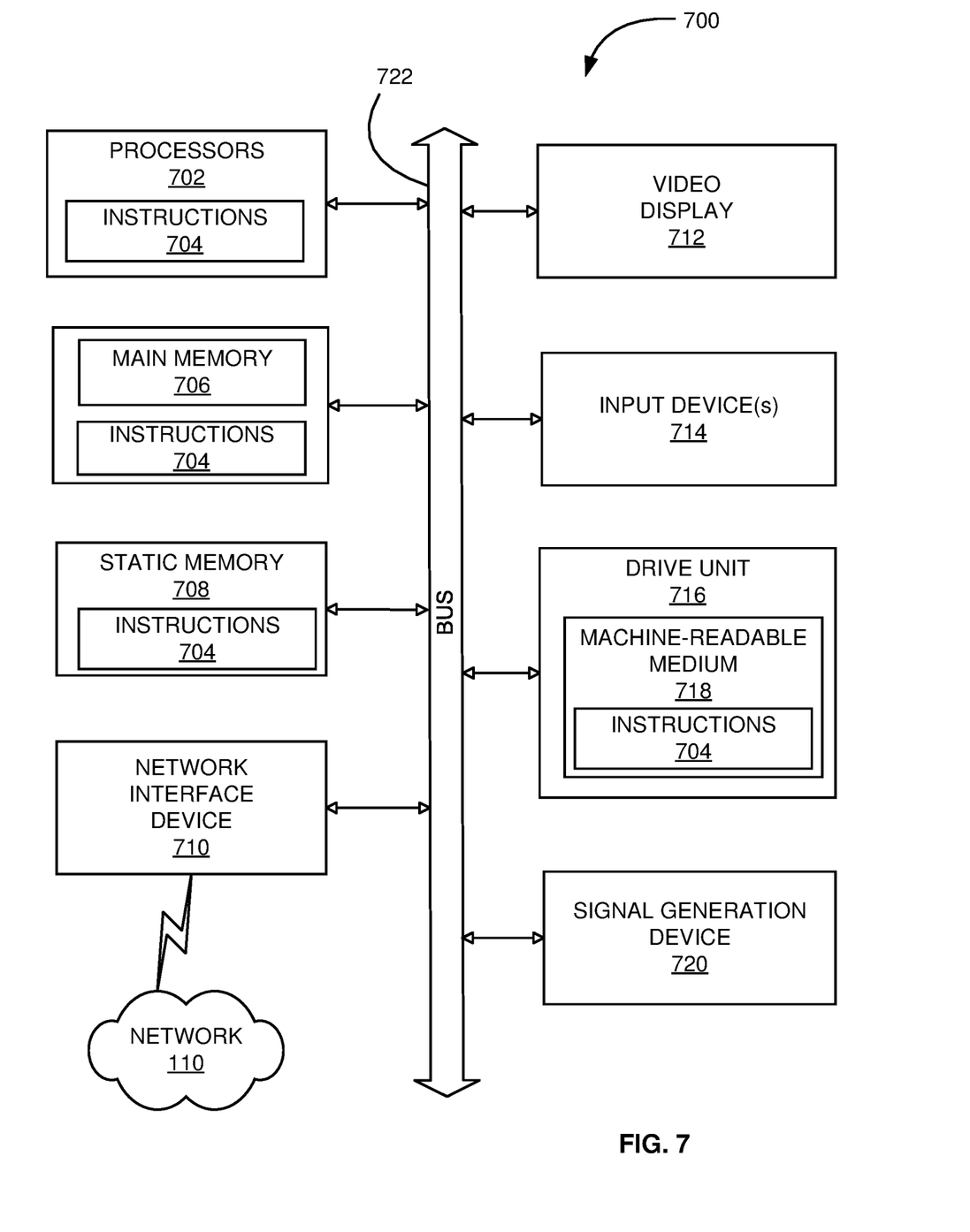
FIG. 7 is a diagrammatic representation of an example machine in the form of a computer system, within which a set of instructions for causing the machine to perform any of one or more of the methodologies discussed herein may be executed.

FIG. 7 is a diagrammatic representation of an example machine in the form of a computer system 700, within which a set of instructions for causing the machine to perform any of one or more of the methodologies discussed herein may be executed. In various example embodiments, the machine operates as a standalone device (e.g. content distribution server 112, MT translator 116, content analyzer 200, router 210, and/or other components described in the figures and specification) or may be connected (e.g., networked) to other machines. In a networked deployment, the machine may operate in the capacity of a server (e.g. content distribution server 112) or a client machine, in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated in FIG. 7, the term "machine" shall also be taken to include any collection of machines that individually or jointly execute a set (or multiple sets) of instructions to perform any one or more of the methodologies discussed herein The example computer system 700 includes a processor or multiple processor(s) 702 (e.g., a central processing unit (CPU), a graphics processing unit (GPU), or both), and a main memory 706 and static memory 708, which communicate with each other via a bus 722. The computer system 700 may further include a video display 712 (e.g., a liquid crystal display (LCD)). The computer system 700 may also include an input/output device(s) 714 including alpha-numeric input devices (e.g., a keyboard), a cursor control device (e.g., a mouse, trackball, touchpad, touch screen, etc.), a voice recognition or biometric verification unit (not shown), a drive unit 716 (also referred to as disk drive unit). Input devices may include interfaces for receiving source content 102 via the network 110 and/or directly from clients, and output interfaces for routing source content 102 via the network 110 and/or directly to translators 116. The computer system 700 may further include a signal generation device 720 (e.g., a speaker) and a network interface device 710.

The disk drive unit 716 includes a computer or machine-readable medium 718 on which is stored one or more sets of instructions and data structures (e.g., instructions 704) embodying or utilizing any one or more of the methodologies or functions described herein. The instructions 704 may also reside, completely or at least partially, within the main memory 706 and/or within the processor(s) 702 during execution thereof by the computer system 700. The main memory 706 and the processor(s) 702 may also constitute machine-readable media.

The instructions 704 may further be transmitted or received over a network (e.g., network 110, see FIG. 1) via the network interface device 710 utilizing any one of a number of well-known transfer protocols (e.g., Hyper Text Transfer Protocol (HTTP)). While the machine-readable medium 718 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and/or the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flow diagram illustrations and/or block diagrams of methods, apparatus (systems) and computer program products according to embodiments of the present technology. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagram and block diagrams in the Figures illustrate the architecture, functionality, and operation of possible implementations of systems, methods and computer program products according to various embodiments of the present technology. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art with the instant application before them will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A router for distributing source content from clients to translators for translation services, the router comprising a processor and memory, the processor executing instructions in the memory to:

obtain extracted source content feature vectors from source content feature vectors of source content received from a client;

select a translator using a weight matrix representing connections between layers of a neural network, the neural network configured to receive a target matrix and an input matrix, the input matrix based on the extracted source content feature vectors, and generate a selection of a translator from the target matrix; and a server for receiving the source content feature vectors from the client, and for transferring the received source content to the selected translator for performing translation services.

2. The router of claim 1, wherein the processor is configured to assemble the input matrix from the source content feature vectors by using the extracted source content feature vectors as input for columns of the input matrix.

3. The router of claim 1, wherein the processor is configured to use a summarization module, a keywords and key-phrases module, a domains module, an entities module, a complexity module, and a machine translation suitability module.

4. The router of claim 1, wherein the router is a component of a server that includes a network interface configured for receiving the source content from the client via a network and routing the source content to the selected translator via the network.

5. The router of claim 1, wherein the processor is configured to:

receive a translator feature for each of a plurality of translators;

receive a plurality of job features; and receive the source content for the translation services.

6. The router of claim 5, wherein the processor is configured to process the input matrix using the target matrix and the weight matrix for the neural network to select the translator from the plurality of translators.

7. The router of claim 6, wherein the source content feature vectors include a summarization of the source content, a plurality of keywords and key-phrases in the source content, an identification of a domain of the source content, a recognition of a plurality of named entities in the source content, a calculation of complexity of the source content, and a calculation of suitability of the source content for machine translation.

8. The router of claim 7, wherein the processor is configured to:

generate a translator feature vector for each of the plurality of translators, each translator feature vector including one or more values representing a feature of the translator; and assemble the target matrix using each translator feature vector as input for columns of the matrix.

9. The router of claim 1, wherein the source content feature vectors include a plurality of summarization features of a document including selecting sentences from the source content.

10. The router of claim 1, wherein the processor is configured to:

select a plurality of sentences representing a document summary feature for inclusion in a summary vector, the sentences selected by:

encoding each sentence of the document into a vector representation;

obtaining a 'centroid' vector as a sum of these vector representations; and selecting sentences having a highest cosine similarity to the centroid for inclusion in the summary vector; and assemble the input matrix using the summary vector as input for a column of the matrix.

11. The router of claim 1, wherein the processor is configured to:

select a plurality of keywords and key-phrases;

generate a keyword vector representation of the plurality of keywords and key-phrases; and assemble the input matrix using the keyword vector as input for a column of the matrix.

12. The router of claim 11, wherein the processor is configured to use at least one of nonparametric spherical topic modeling with word embeddings, non-parametric latent Dirichlet analysis, and Tf/Idf analysis.

13. The router of claim 1, wherein the processor is configured to:

identify one or more domains using multilayer perceptron with inverse document frequency weighted bag-of-words feature vector;

generate a domain feature vector representation of the one or more identified domains; and assemble the input matrix using the domain feature vector as input for a column of the matrix.

14. The router of claim 1, wherein the processor is configured to:

identify one or more named entities using a Conditional Random Field model for entity recognition;

generate an entity feature vector representation of the one or more identified named entities; and assemble the input matrix using the entity feature vector as input for a column of the matrix.

15. The router of claim 1, wherein the processor is configured to:

calculate a plurality of complexity values;

generate a complexity feature vector including the plurality of complexity values; and assemble the input matrix using the complexity feature vector as input for a column of the matrix.

16. The router of claim 15, wherein the processor is configured to calculate a syntactic complexity, a lexical complexity, an uber index, a Flesch Kincaid score, and an overall complexity.

17. A system for routing source content to translators for translation services, the system comprising:

a router including an artificial neural network and a weight matrix representing connections between layers of the artificial neural network, the router configured to receive a target matrix and an input matrix for a source document; and generate a selection of a translator from the target matrix; and a server that transfers the source content to the selected translator for performing translation services.

18. The system of claim 17, wherein the router uses source content feature vectors of the source document as input for columns of the input matrix.

19. The system of claim 18, wherein the router is configured to receive a job vector representing a plurality of features and using the job vector as a column of the input matrix.

20. The system of claim 19, wherein the router is configured to:

receive a plurality of translator feature vectors, each translator feature vector representing a plurality of translation features for a translator of a plurality of translators; and assemble the target matrix using the translator feature vectors as columns of the target matrix.

* * * * *